(12) United States Patent
Hakansson

(10) Patent No.: US 8,685,141 B2
(45) Date of Patent: Apr. 1, 2014

(54) WET SCRUBBER AND A METHOD OF CLEANING A PROCESS GAS

(75) Inventor: Rikard Hakansson, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 108 days.

(21) Appl. No.: 13/023,028

(22) Filed: Feb. 8, 2011

(65) Prior Publication Data

US 2011/0203456 A1 Aug. 25, 2011

(30) Foreign Application Priority Data

Feb. 25, 2010 (EP) .................................. 10154669

(51) Int. Cl.
*B01D 53/14* (2006.01)

(52) U.S. Cl.
USPC ........ 95/13; 96/271; 96/273; 96/322; 95/235; 95/224; 95/19; 261/118

(58) Field of Classification Search
None
See application file for complete search history.

(56) References Cited

U.S. PATENT DOCUMENTS

| | | | |
|---|---|---|---|
| 4,263,021 A | 4/1981 | Downs et al. | |
| 4,315,872 A * | 2/1982 | Senjo et al. | 261/113 |
| 5,173,093 A * | 12/1992 | Johnson et al. | 95/224 |
| 5,620,144 A * | 4/1997 | Strock et al. | 239/557 |
| 5,648,048 A | 7/1997 | Kuroda et al. | |
| 6,102,377 A * | 8/2000 | Doughty | 261/117 |
| 6,562,304 B1 * | 5/2003 | Mizrahi | 422/171 |
| 2008/0044335 A1 * | 2/2008 | Anttila et al. | 423/243.01 |
| 2009/0320687 A1 * | 12/2009 | Ueda et al. | 96/243 |

FOREIGN PATENT DOCUMENTS

| | | |
|---|---|---|
| DE | 196 40 074 | 10/1997 |
| EP | 0 524 729 | 1/1993 |
| EP | 0 882 487 | 12/1998 |
| EP | 1 510 242 | 3/2005 |
| GB | 2 297 705 | 8/1996 |
| WO | WO 98/37947 | 9/1998 |

OTHER PUBLICATIONS

European Search Report, dated May 4, 2010 (EP Appln. No. 10154669.5).

* cited by examiner

*Primary Examiner* — Duane Smith
*Assistant Examiner* — Pankti Patel
(74) *Attorney, Agent, or Firm* — Rita D. Vacca

(57) ABSTRACT

A wet scrubber (1) and a method of using the wet scrubber to clean a process gas containing sulphur dioxide comprising at least one spray level system (20) with atomizing nozzles (38) to which an absorption liquid is supplied for atomization by the nozzles (38). The method comprises operating the spray level system (20) in at least a first operating mode with an active nozzle density of at least 0.7 nozzles/m$^2$, an absorption liquid flow of at least 10 m$^3$/hour per nozzle and a Total Flow of at least 30 m$^3$/hour/m$^2$.

11 Claims, 9 Drawing Sheets

WET SCRUBBER AND A METHOD OF CLEANING A PROCESS GAS

FIELD OF THE INVENTION

The present invention relates to a method of cleaning a process gas containing sulphur dioxide by means of a wet scrubber comprising at least one spray level system with atomizing nozzles to which an absorption liquid is supplied and atomized by the atomizing nozzles.

The present invention further relates to a wet scrubber being operative for cleaning a process gas containing sulphur dioxide, the wet scrubber comprising at least one spray level system with atomizing nozzles which is operative for receiving an absorption liquid and for atomizing said absorption liquid by means of the atomizing nozzles.

BACKGROUND OF THE INVENTION

In the combustion of a fuel, such as coal, oil, peat, waste, etc., in a combustion plant, such as a power plant, a hot process gas is generated, such process gas containing, among other components, sulfur oxides, such as sulfur dioxide, $SO_2$. Sulfur dioxide is an environmental pollutant. Hence, it is necessary to remove at least a portion of the sulfur dioxide from the process gas before the process gas can be released into the atmosphere.

U.S. Pat. No. 5,620,144 describes a wet scrubber which is operative for removing sulfur dioxide from a process gas. The wet scrubber comprises a vertical tower in which a number of atomization nozzles are arranged. The nozzles are arranged in at least one header arrangement. The header arrangement comprises a plurality of supply headers, each comprising a number of feeder lines. The feeder lines of one supply header are located directly atop the feeder lines of another supply header. A plurality of connectors are coupled to each of the feeder lines, each connector supporting at least one nozzle. The connectors and nozzles of one feeder line are staggered with respect to the connectors and nozzles of an adjacent feeder line located in close vertical proximity. The process gas passes vertically upwards through the wet scrubber tower and contacts the limestone absorption liquid droplets dispersed by the nozzles. The limestone absorption liquid droplets capture the sulfur dioxide of the process gas, and generates a solid end product.

A disadvantage of the wet scrubber of U.S. Pat. No. 5,620,144 is that the wet scrubber tower is a high piece of equipment, which makes it a costly investment and maintenance item. Furthermore, in combustion plants combusting various types and/or loads of fuels, it is difficult to control the sulfur dioxide removal efficiency to ensure suitable sulfur dioxide removal with minimal excesses. For example, when sulfur dioxide loads are high, the sulfur dioxide removal capacity must be high to ensure suitable sulfur dioxide removal. However, when sulfur dioxide loads are lower, the sulfur dioxide removal capacity may be lower ensuring suitable sulfur dioxide removal while minimizing excesses, e.g., energy consumption, equipment wear and the like.

SUMMARY OF THE INVENTION

An object of the present invention is to provide a wet scrubber and a method of using the wet scrubber to clean a process gas containing sulphur dioxide in a manner more efficient than that of the prior art.

This object is achieved by means of a method of cleaning a process gas containing sulphur dioxide by means of a vertical tower wet scrubber comprising at least one spray level system with atomizing nozzles. An absorption liquid is supplied to the spray level system so as to flow therethrough to the atomizing nozzles. The absorption liquid may be sprayed from the atomizing nozzles as a multitude of absorption liquid droplets. The method comprises operating the spray level system in at least a first operating mode wherein the spray level system has an active nozzle density of at least 0.7 nozzles per $m^2$ of internal wet scrubber horizontal cross-sectional area. To calculate the internal wet scrubber horizontal cross-sectional area, one takes the horizontal cross section of the wet scrubber at the mid-point of the spray level system and calculates the area of that cross section depending on its shape, i.e., circle, square, rectangle or the like. For the active nozzle density calculation, a nozzle is considered "active" and included in the calculation when it is actively spraying within the wet scrubber. Nozzles that are not active, i.e., not spraying, are not included in the active nozzle density calculation. Hence, the number of active nozzles in a spray level system divided by the horizontal cross-sectional area equals the active nozzle density of the spray level system. In the first operating mode, each of the spray level system active nozzles is supplied with an absorption liquid flow of at least 10 $m^3$/hour, corresponding to 10000 liters/hour, or 167 liters/minute. The active nozzle density of at least 0.7 nozzles/$m^2$, and the flow of absorption liquid to each active nozzle of at least 10 $m^3$/hour, should yield, in the first operating mode and when multiplied together, an area based flow of absorption liquid supplied to the spray level system of at least 30 $m^3$ per hour and $m^2$ of internal wet scrubber horizontal cross-sectional area, hereinafter referred to as Total Flow. Hence, the active nozzle density and the flow per nozzle cannot both be at their minimum values when the spray level system is operated in this first operating mode, since the Total Flow would then only be 7 $m^3$ per hour and $m^2$ (0.7 nozzles/$m^2 \times 10$ $m^3$/hour). The process gas should preferably be flowing substantially vertically upwards through the wet scrubber vertical tower towards said spray level system at a process gas vertical velocity, V, of at least about 3.5 m/s, as described in more detail below.

An advantage of operating the spray level system in the first operating mode just described is that the removal of sulphur dioxide is very efficient. Hence, due to the efficiency of a spray level system operating within the parameters set forth above, the spray level system may be housed in a shorter wet scrubber vertical tower. Less efficient spray level systems of the prior art required taller wet scrubber vertical towers in order to accommodate a greater number of less efficient spray level systems. Operating the wet scrubber in accordance with the first mode of operation described above, fewer spray level systems are needed and therefore the wet scrubber vertical tower may be shorter. A shorter wet scrubber vertical tower is very desirable due to reduced construction and maintenance costs associated therewith.

According to one embodiment said spray level system comprises at least a first and a second tubular portion, the method of using the spray level system further comprising controlling the amount of absorption liquid supplied to the first tubular portion independently from the amount of absorption liquid supplied to the second tubular portion. An advantage of this embodiment is that the operation of the wet scrubber can be controlled more accurately depending on the sulphur dioxide absorption capacity requirements of the particular process gas being cleaned.

According to one embodiment, the spray level system comprises at least a first tubular portion and a second tubular portion, each of which comprising nozzles distributed substantially evenly over a horizontal cross-section of the wet scrubber. An advantage of this embodiment is that when one tubular portion is shut off from absorption liquid flow, or when the flow of absorption liquid is substantially reduced, the other active tubular portion still provides an even distribution of absorption liquid over the entire horizontal cross-section of the wet scrubber.

According to one embodiment a method of using a spray level system further comprises controlling the amount of absorption liquid supplied to the spray level system to adjust the operation of the spray level system between said previously described first operating mode, being a higher sulphur dioxide absorption capacity operating mode, (hereinafter "HC" operating mode), and a second operating mode, being a lower sulphur dioxide absorption capacity operating mode, (hereinafter "LC" operating mode). In the LC operating mode, at least one of said operating parameters, i.e., active nozzle density, absorption liquid flow rate to each nozzle, Total Flow and process gas vertical velocity, is not fulfilled as is the case with HC operating mode. An advantage of this embodiment is that the spray level system can be adjusted for operation in the HC operating mode when the requirements for sulphur dioxide removal are higher, and in the LC operating mode when the requirements for sulphur dioxide removal are lower. Hence, excesses in the form of energy consumption, equipment wear and the like can be reduced by operating the wet scrubber spray level system in the LC operating mode during periods of lower process gas load and/or lower process gas sulphur dioxide concentrations.

According to one method embodiment, the amount of absorption liquid supplied to the spray level system is controlled based on variances in the process gas pressure drop as measured over the spray level system. The process gas pressure drop provides a good indication of whether the spray level system is operating in the first operating mode, i.e., the HC operating mode, or in the second operating mode, i.e., the LC operating mode.

According to one embodiment, the wet scrubber comprises at least two individually controlled spray level systems each having at least two individually controlled tubular portions. Each spray level system is individually controllable to adjust operation between said HC operating mode and said LC operating mode. Furthermore, each spray level system and each tubular portion may be individually controllable to shift operation to an inactive mode. An advantage of this embodiment is that the level of sulphur dioxide removal can be controlled very accurately so as to minimize excesses. For example, the wet scrubber may operate with all spray level systems in HC operating mode, some spray level systems in HC operating mode and some spray level systems in LC operating mode, all spray level systems in LC operating mode, some spray level systems in LC operating mode and some spray level systems in an inactive mode or any desired combination of HC operating mode, LC operating mode and inactive mode to meet the required sulphur dioxide absorption capacity required with minimized excesses.

According to one embodiment said spray level system, when operating in the HC operating mode, utilizes at least one third of the active nozzles to spray at least a portion of the absorption liquid supplied thereto in an upward direction. An advantage of this embodiment is that spraying at least a portion of the absorption liquid in an upward direction using the parameters described herein improves the formation of a "cloud" of absorption liquid and process gas at and above the spray level system. Creation of such a cloud enables greater sulphur dioxide absorption than otherwise achievable.

According to one embodiment the vertical height, H, of the spray level system, as measured from the lowest nozzle opening to the uppermost nozzle opening of the spray level system, is less than 0.75 m. An advantage of this embodiment is that the spray level system becomes compact, with all of the absorption liquid being sprayed from the nozzles of the spray level system at almost the same vertical level. Spraying all of the absorption liquid at the same, or at least almost the same, vertical level promotes the formation of the "cloud" of absorption liquid and process gas. As noted previously, the "cloud" of absorption liquid and process gas is desirable in the wet scrubber vertical tower because it significantly increases the sulphur dioxide absorption efficiency of the wet scrubber. Hence, a short vertical distance H, preferably less than 0.75 m, between the uppermost nozzle opening and the lowermost nozzle opening of the spray level system promotes an efficient sulphur dioxide removal.

According to one embodiment the active nozzle density of the spray level system is less than 5 nozzles per $m^2$. A nozzle density greater than 5 nozzles per $m^2$ tends to increase the cost of the spray level system without improving the sulphur dioxide absorption efficiency. With an active nozzle density of more than 5 nozzles per $m^2$ it would still be possible to operate in HC operating mode, but without significant advantages.

According to one embodiment, each spray level system nozzle is operative for an absorption liquid flow of at least 10 $m^3/h$, corresponding to 10000 liters/h, or 167 liters/minute, at a spraying pressure, measured using water, of approximately 0.3-2.0 bar. An advantage of a nozzle having such operative capabilities is that it provides for efficient atomization of the absorption liquid without undue power consumption.

According to one embodiment, the absorption liquid flow supplied to each active nozzle is less than 180 $m^3/hour$, corresponding to 180000 liters/hour, or 3000 liters/minute. The Total Flow of the spray level system is preferably less than 200 $m^3/hour/m^2$. An advantage of this embodiment is that it provides for efficient sulphur dioxide absorption without requiring unnecessarily high flows of absorption liquid.

According to one embodiment, the process gas flows substantially vertically upwards through the wet scrubber vertical tower towards said spray level system at a process gas vertical velocity of less than 8 m/s. A higher process gas vertical velocity than 8 m/s tends to strongly increase the flue gas pressure drop as measured over the wet scrubber and the energy consumption without further improving the sulphur dioxide absorption efficiency.

A further object of the present invention is to provide a wet scrubber that is more efficient in removing sulphur dioxide from a process gas than the prior art wet scrubber.

This object is achieved by means of a wet scrubber operative for cleaning a process gas containing sulphur dioxide. The wet scrubber comprises at least one spray level system operative for receiving a flow of absorption liquid therethrough and for atomizing said absorption liquid by means of atomizing nozzles. The spray level system comprises an active nozzle density of at least 0.7 nozzles per $m^2$ of internal wet scrubber horizontal cross-sectional area. When the spray level system is operated in HC operating mode, each of the active atomizing nozzles disperse an absorption liquid flow of at least 10 $m^3/h$, corresponding to 10000 liters/hour, or 167 liters/minute, supplied from at least one pump. The Total Flow supplied to the spray level system should, in the HC operating mode, be at least 30 $m^3/hour/m^2$. An advantage of this wet scrubber is that it requires a reduced wet scrubber vertical tower height since the removal efficiency of the spray level system is optimized.

According to one embodiment, said spray level system comprises at least a first tubular portion and a second tubular portion. A control device is provided for controlling the flow of absorption liquid to the first tubular portion independently of controlling the flow of absorption liquid to the second tubular portion. Each of the first and second tubular portions comprise atomizing nozzles substantially evenly distributed over a horizontal cross-section of the wet scrubber. An advantage of this embodiment is that if one tubular portion is shut off from absorption liquid flow, the absorption liquid may still be evenly distributed over the entire horizontal cross-sectional area of the wet scrubber by means of the other tubular portion.

According to one embodiment, the wet scrubber comprises a control unit for controlling the supply of absorption liquid to the spray level system. The control unit may be used to adjust the operation of the spray level system between the HC operating mode, and the LC operating mode. An advantage of this wet scrubber is that energy consumption is minimized by operating the wet scrubber in a mode best suited to meet the actual sulphur dioxide absorption requirements necessary at any given time.

Further objects and features of the present invention will be apparent from the following detailed description and claims.

BRIEF DESCRIPTION OF THE DRAWINGS

The invention is described in more detail below with reference to the appended drawings in which.

DESCRIPTION OF PREFERRED EMBODIMENTS

Figure 1:
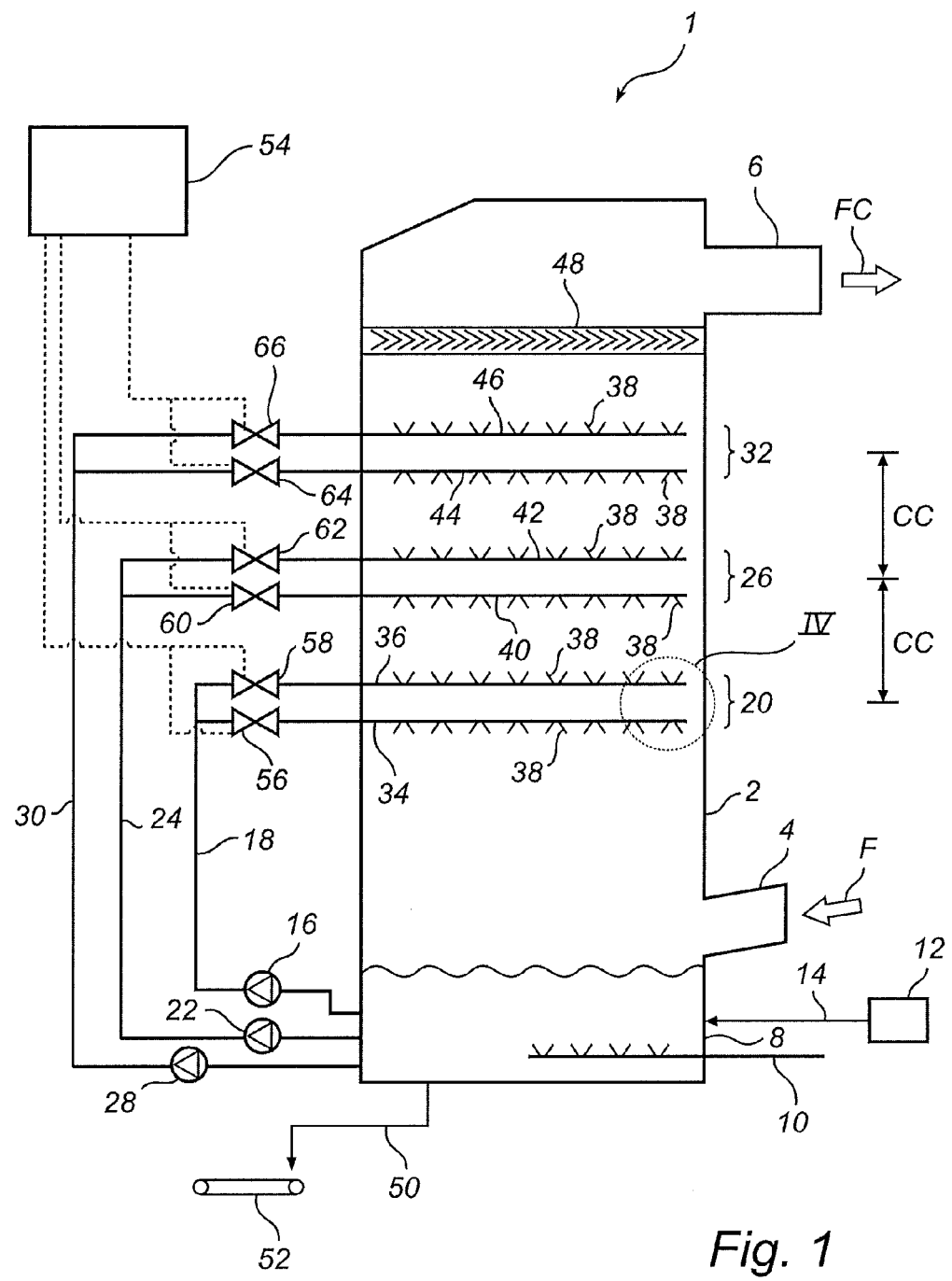
FIG. 1 is a schematic side view of a wet scrubber in accordance with a first embodiment.

FIG. 1 illustrates a wet scrubber 1. The wet scrubber 1 is operative for removing at least a portion of the sulphur dioxide content of a process gas, in the form of a flue gas, F, generated in a boiler (not shown) which is operative for combusting a fuel, such as coal or oil.

The wet scrubber 1 comprises a vertical open tower 2, an inlet 4 for flue gas, F, to be cleaned, and an outlet 6 for flue gas, FC, from which at least a portion of the sulphur dioxide content has been removed.

An absorption liquid tank 8 is arranged at the bottom of the vertical open tower 2. The absorption liquid tank 8 is provided with an oxidation arrangement 10. Fresh limestone, $CaCO_3$, is supplied to the absorption liquid tank 8 from an absorbent supply device comprising a limestone storage 12 and a supply pipe 14. It will be appreciated that absorption liquid tank 8 may, as an alternative, be positioned outside of tower 2, and that the supply of limestone could, as an alternative, enter the system at other locations, as a dry powder, a slurry or both.

The wet scrubber 1 further comprises a first circulation pump 16 which circulates, in an absorption liquid circulation pipe 18, a limestone absorption liquid, sometimes referred to as a limestone slurry, from the absorption liquid tank 8 to a first spray level system 20 positioned vertically lowest within open tower 2. The wet scrubber 1 further comprises a second circulation pump 22 which circulates, in an absorption liquid circulation pipe 24, a limestone absorption liquid from the absorption liquid tank 8 to a second spray level system 26 positioned vertically intermediate within open tower 2, and a third circulation pump 28 which circulates, in an absorption liquid circulation pipe 30, a limestone absorption liquid from the absorption liquid tank 8 to a third spray level system 32 positioned vertically highest within open tower 2. A vertical distance, shown as a distance CC in FIG. 1, between the mid-point of the first spray level system 20 and the mid-point of the second spray level system 26, as well as a vertical distance, also shown as a distance CC in FIG. 1, between the mid-point of the second spray level system 26 and the mid-point of the third spray level system 32, is preferably 1.25 m to 3 m. A distance CC which is less than 1.25 m is less preferable, since such distance tends to cause unwanted interactions between adjacent spray level systems, resulting in a decreased sulphur dioxide removal efficiency. A distance CC which is more than 3 m is less preferable, since such distance tends to result in a very high overall height of the scrubber tower, increasing the investment and operating costs.

The first spray level system 20 comprises a first tubular portion 34, and a second tubular portion 36. The first tubular portion 34 comprises a number of fluidly connected atomizing nozzles 38 that finely distribute limestone absorption liquid, circulated by the pump 16, to achieve effective contact between the limestone absorption liquid and the flue gas passing through the wet scrubber 1 and flowing substantially vertically upwards inside open tower 2. The second tubular portion 36 comprises a number of fluidly connected atomizing nozzles 38. The atomizing nozzles 38 of the second tubular portion 36 are all or are partially of the same or of a different type as the atomizing nozzles of the first tubular portion 34. All or some of the atomizing nozzles 38 may, for example, be of the type 4CF-303120, available from Spraying Systems Co, Wheaton, Ill., USA. This type of atomizing nozzle is operative for a liquid flow of about 70 $m^3$/hour, corresponding to 70000 liters/hour, or 1170 liters/minute, at a spraying pressure measured using water, of about 0.5 bar, as well as a liquid flow of about 107 $m^3$/hour, corresponding to 107000 liters/hour, or 1780 liters/minute, at a spraying pressure measured using water, of about 1.2 bar.

The second spray level system 26 is similar if not identical to the first spray level system 20 and comprises a first tubular portion 40, comprising a number of fluidly connected atomizing nozzles 38, and a second tubular portion 42, also comprising a number of fluidly connected atomizing nozzles 38.

The third spray level system 32 is similar if not identical to the first and second spray level systems 20, 26 and comprises a first tubular portion 44, comprising a number of fluidly connected atomizing nozzles 38, and a second tubular portion 46, also comprising a number of fluidly connected atomizing nozzles 38.

A mist eliminator 48 is located above the third spray level system 32. The mist eliminator 48 removes at least a portion of the absorption liquid droplets entrained by the cleaned flue gas, FC.

In the wet scrubber 1, sulphur dioxide, $SO_2$, in the flue gas reacts with the limestone, $CaCO_3$, to form calcium sulphite, $CaSO_3$, which is subsequently oxidized to form gypsum, $CaSO_4$. The oxidation of calcium sulphite is preferably performed by bubbling air or oxygen gas through the limestone absorption liquid using oxidation arrangement 10. Hence, the limestone absorption liquid comprises, in addition to the limestone, also small amounts of calcium sulphite and, as a major constituent, gypsum. The gypsum formed through this process is removed from the wet scrubber 1 via a disposal pipe 50 and is forwarded to a gypsum dewatering unit, schematically indicated as belt filter 52. The dewatered gypsum may be commercially used, for example in wallboard production.

In addition to sulphur dioxide, $SO_2$, the wet scrubber 1 will remove, at least partly, also other contaminants from the flue gas. Examples of such other contaminants include sulphur trioxide, $SO_3$, hydrochloric acid, HCl, hydrofluoric acid, HF, and other acid contaminants. Still further, the wet scrubber 1 may also remove, at least partly, also other types of contaminants from the flue gas, such as for example dust particles and mercury.

A control unit 54 controls the operating parameters of wet scrubber 1. To this end, a control device in the form of a first control valve 56 is provided on the first tubular portion 34 of the first spray level system 20, and a control device in the form of a second control valve 58 is provided on the second tubular portion 36 of the first spray level system 20. Furthermore, in the second spray level system 26 a first control valve 60 is provided on the first tubular portion 40, and a second control valve 62 is provided on the second tubular portion 42. Finally, in the third spray level system 32 a first control valve 64 is provided on the first tubular portion 44, and a second control valve 66 is provided on the second tubular portion 46. The control unit 54 controls, individually, each of the valves 56, 58, 60, 62, 64 and 66.

Figure 2:
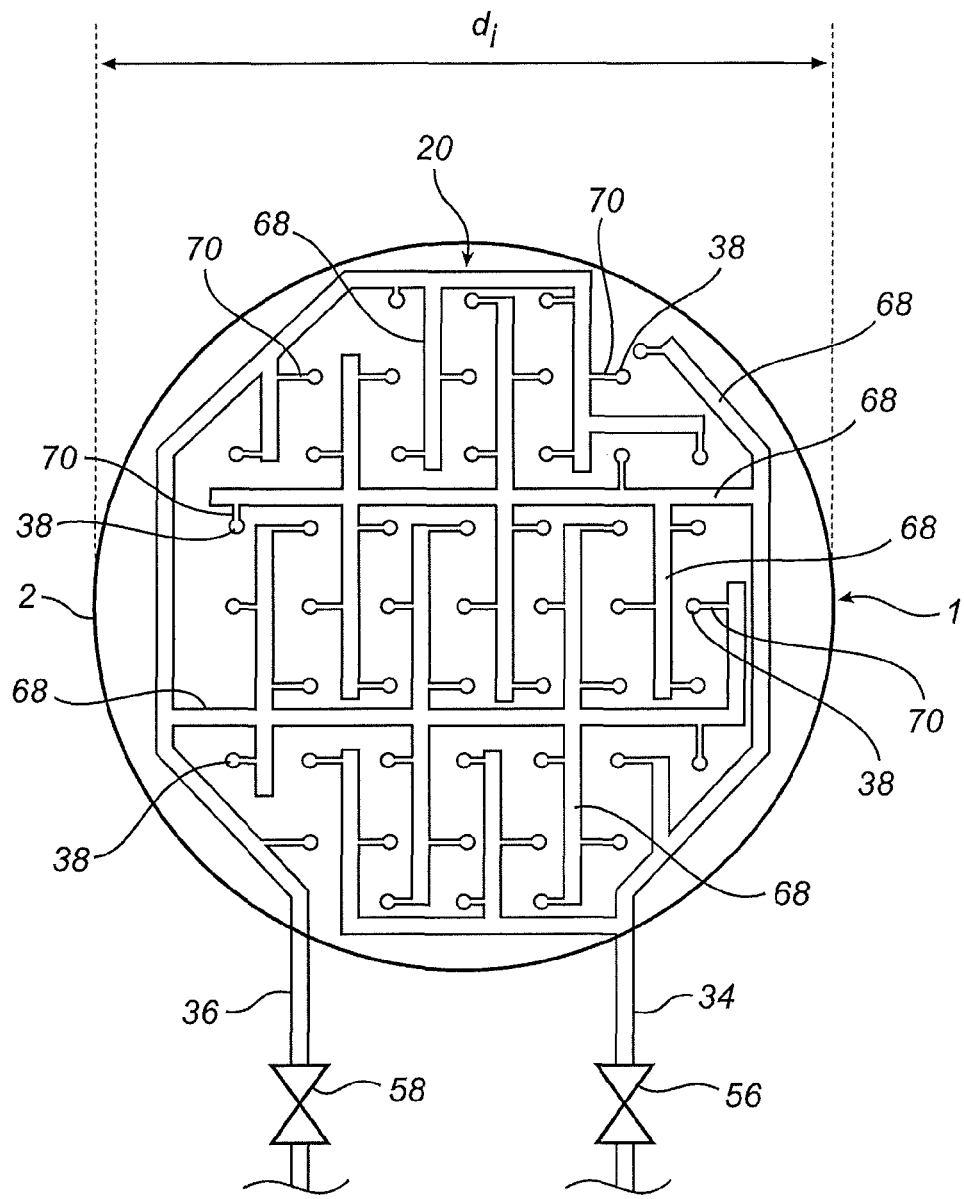
FIG. 2 is a schematic top view of a spray level system of the wet scrubber.

FIG. 2 illustrates the first spray level system 20 as viewed from the top thereof, and in more detail. The second and third spray level systems 26, 32 have the same principal design as the first spray level system 20. As can be seen in FIG. 2, each of the first and second tubular portions 34, 36 is provided with a number of fluidly connected tubular extensions 68. The tubular extensions 68 form a "grid" extending from the respective tubular portions 34, 36. Each of the tubular extensions 68 is provided with one or more fluidly connected tubular connectors 70, each such tubular connector 70 fluidly connects to an atomizing nozzle 38. The tubular extensions 68 of the first tubular portion 34 are intermingled with the tubular extensions 68 of the second tubular portion 36. The result, as illustrated in FIG. 2, is that atomizing nozzles 38 that are connected to the first tubular portion 34 are well-mixed with the atomizing nozzles 38 that are connected to the second tubular portion 36. Likewise, approximately the same number of atomizing nozzles 38, are connected to the first tubular portion 34 as are connected to the second tubular portion 36. The consequence is that if a tubular portion, for example the first tubular portion 34, is shut off, then the flow of limestone absorption liquid through the first spray level system 20 will be reduced by about half, but the absorption liquid that does flow to spray level system 20 will be evenly distributed over the entire horizontal cross-section of the tower 2 by means of the atomizing nozzles 38 of the second tubular portion 36.

As is illustrated in FIG. 2, first tubular portion 34 is provided with twenty-two atomizing nozzles 38. Furthermore, second tubular portion 36 is provided with twenty-eight atomizing nozzles 38. Hence, the total number of atomizing nozzles 38 is fifty. The internal diameter, di, of tower 2, such diameter being measured at the midpoint of spray level system 20, is 7.15 m. Thus, the internal wet scrubber horizontal cross-sectional area of the tower 2, as measured at the midpoint of the spray level system 20, is 40 m² (7.15×7.15×pi/4). Hence, the nozzle density of spray level system 20 as illustrated in the example of FIG. 2, is 50/40 m²=1.25 nozzles/m².

Figure 3:
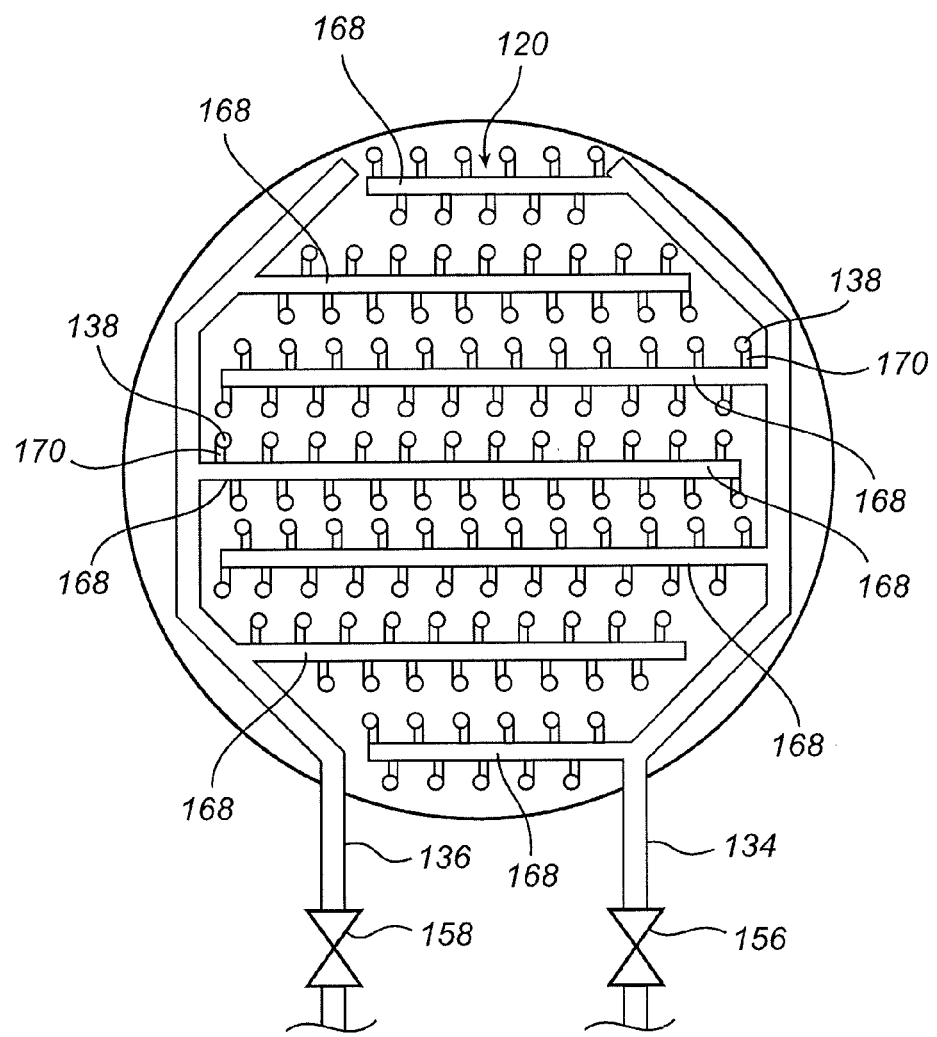
FIG. 3 is a schematic top view of an alternative spray level system.

FIG. 3 illustrates an alternative first spray level system 120 as viewed from the top thereof. The first spray level system 120 is provided with a first tubular portion 134, being provided with a first control valve 156, and a second tubular portion 136, being provided with a second control valve 158. Each of the tubular portions 134, 136 is provided with a number of fluidly connected tubular extensions 168. Each tubular extension 168 is substantially straight and extends from the tubular portion to which it is connected and towards the opposite tubular portion. Hence, the tubular extensions 168 of the first tubular portion 134 and of the second tubular portion 136 form a "grid" by extending between one another in an alternating manner, as illustrated in FIG. 3. Each of the tubular extensions 168 is provided with a number of fluidly connected tubular connectors 170, each such tubular connector 170 fluidly connects to an atomizing nozzle 138. As with the embodiment of FIG. 2, the alternative first spray level system 120 has atomizing nozzles 138 that are fluidly connected to the first tubular portion 134 and well-mixed with the atomizing nozzles 138 that are fluidly connected to the second tubular portion 136. Hence, if a tubular portion, for example the first tubular portion 134, is shut off, then the flow of limestone absorption liquid through the first spray level system 120 will be reduced by about half, but the absorption liquid that is still supplied to the spray level system 120 will be evenly distributed over the entire horizontal cross-section of tower 2 by means of the atomizing nozzles 138 of the second tubular portion 136.

Figure 4A:
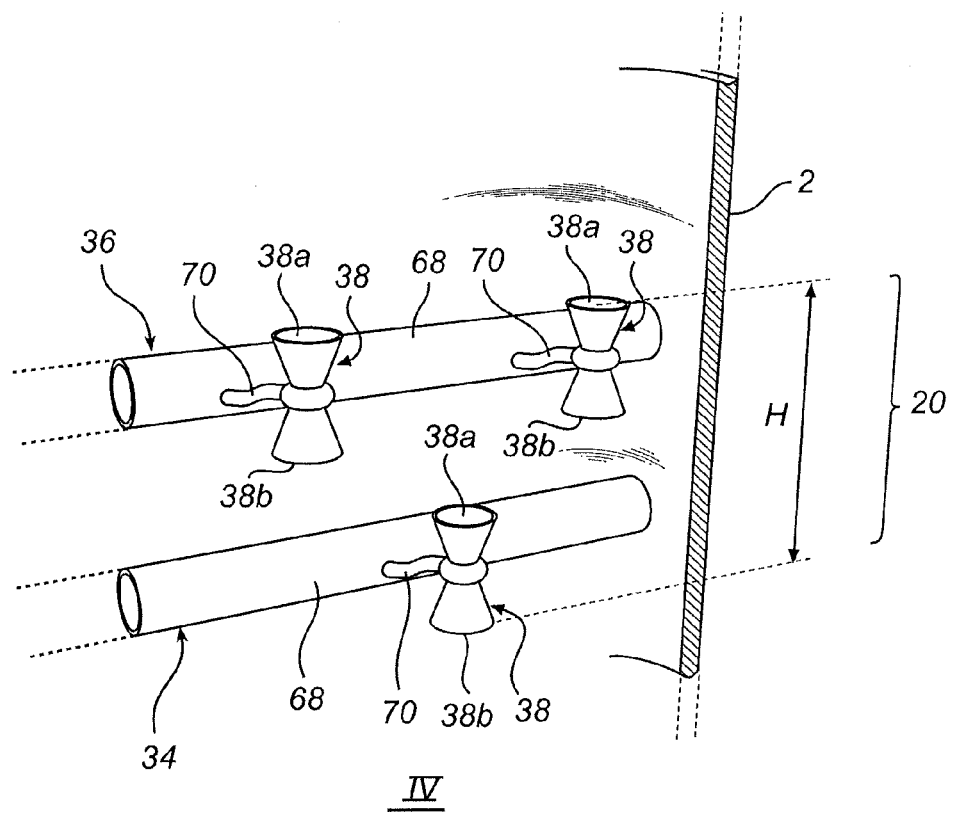
FIG. 4a is an enlarged side-view of the area IV illustrated in FIG. 1.

FIG. 4a illustrates in more detail the arrangement of the two tubular portions 34 and 36 of the first spray level system 20. As can be seen, each tubular portion 34 and 36 is provided with fluidly connected tubular extensions 68 fluidly connected to tubular connections 70 to which the atomizing nozzles 38 are fluidly connected. The atomizing nozzles 38 may be the same or different and may be of the "dual orifice" nozzle type, meaning that the absorption liquid is sprayed from two opposing nozzle openings 38a and 38b, e.g., upwards and downwards, from each of the atomizing nozzles 38. In the embodiment illustrated in FIG. 4a the first tubular portion 34 is positioned slightly below the second tubular portion 36, i.e., in two different horizontal planes within tower 2. It will be appreciated that, as an alternative, the two tubular portions 34, and 36 could be positioned on exactly the same level, i.e., in the same horizontal plane within tower 2. As a still further alternative the first tubular portion 34 could be positioned slightly above the second tubular portion 36. Hence, the exact relative vertical position of the two tubular portions 34, 36 is not critical. However, the vertical height H of the first spray level system 20 is preferably less than 0.75 m, and more preferably less than 0.5 m, in order to achieve the desirable effects described in more detail hereinafter. The vertical height H is, as depicted in FIG. 4a, measured from the lowest nozzle opening to the uppermost nozzle opening of the spray level system 20.

Figure 4B:
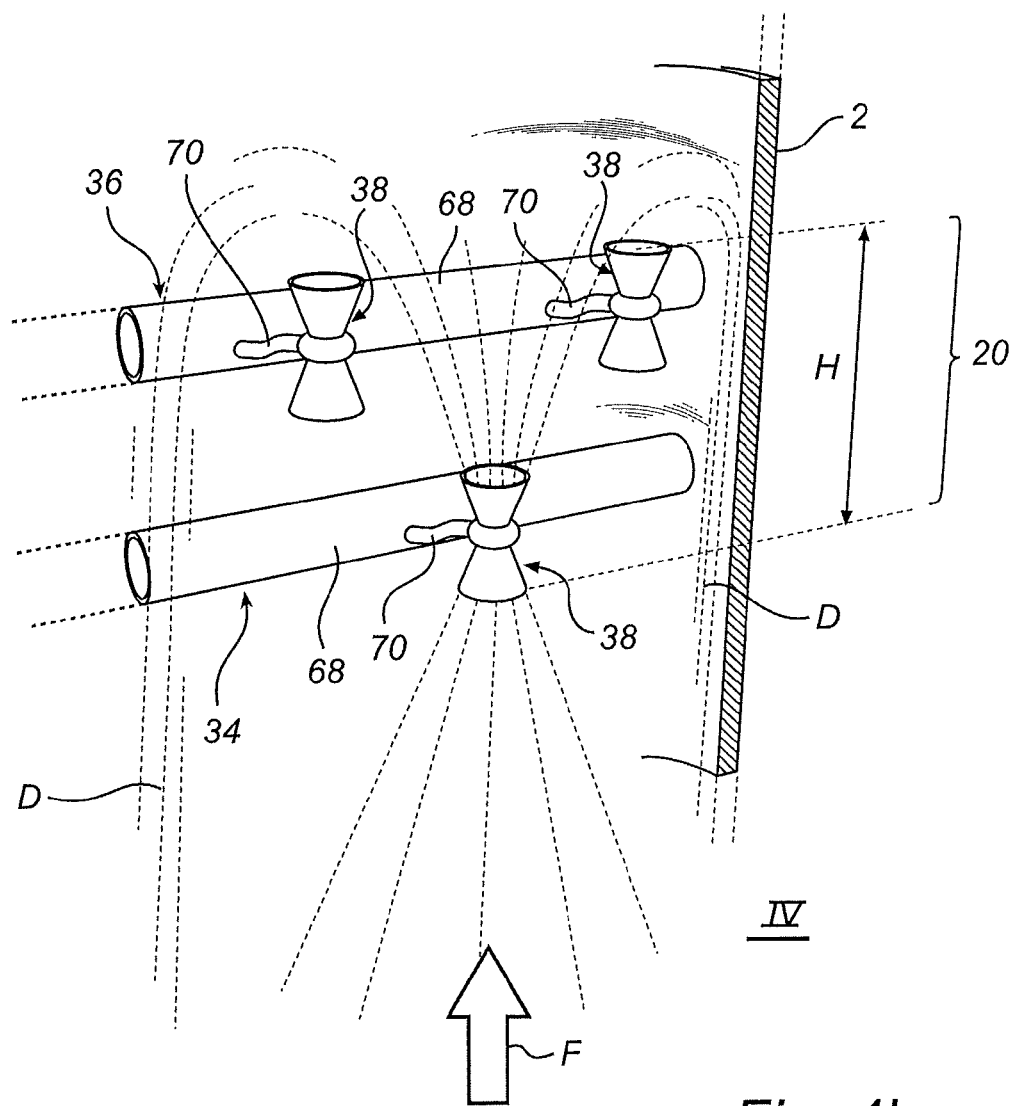
FIG. 4b is an enlarged side-view illustrating a LC operating mode.

FIG. 4b illustrates the first spray level system 20 when in a lower sulphur dioxide absorption capacity operating mode, denoted "LC". The LC operating mode is utilized when the requirements for removal of sulphur dioxide are lower, and/or when the flue gas load is low and/or when the sulphur dioxide load is low. In the LC operating mode the control unit 54, illustrated in FIG. 1, has controlled the first control valve 56 to be open, and the second control valve 58 to be closed. Hence, the first circulation pump 16, also illustrated in FIG. 1, supplies the first tubular portion 34 with absorption liquid, but no absorption liquid is supplied to the second tubular portion 36. As a consequence, the twenty-two atomizing nozzles of the first tubular portion 34 are active, while the twenty-eight atomizing nozzles of the second tubular portion 36 are inactive. The active atomizing nozzle density is, hence, 22/40 m$^2$=0.55 nozzles per m$^2$. As illustrated in FIG. 4$b$, the absorption liquid is sprayed, both upwards and downwards within tower 2, by the atomizing nozzles 38 of the first tubular portion 34. The sprayed absorption liquid contacts the flue gas F, flowing vertically upwards through the tower 2, and absorbs sulphur dioxide from the flue gas F. The absorption liquid that has been sprayed by means of the nozzles 38 form larger aggregates that flow downwards as schematically indicated by flows D in FIG. 4$b$. Substantially all the absorption liquid, both the portion sprayed upwards and the portion sprayed downwards by atomizing nozzles 38 is collected in absorption liquid tank 8, illustrated in FIG. 1, from which it is again pumped and circulated to the various spray level systems.

FIG. 4$c$ illustrates the first spray level system 20 when in a higher sulphur dioxide absorption capacity operating mode, denoted "HC". The HC operating mode is utilized when the requirements for removal of sulphur dioxide are higher, and/or when the flue gas load is higher and/or when the sulphur dioxide load is higher. In the HC operating mode the control unit 54, illustrated in FIG. 1, has controlled both the first valve 56 and the second control valve 58 to be open. Hence, the first circulation pump 16, also illustrated in FIG. 1, supplies both the first tubular portion 34 and the second tubular portion 36 with absorption liquid. As a consequence, the twenty-two atomizing nozzles 38 of the first tubular portion 34 are active, and so are the twenty-eight nozzles of the second tubular portion 36. The active nozzle density is, hence, 50/40 m$^2$=1.25 nozzles per m$^2$. As illustrated in FIG. 4$c$, the absorption liquid is sprayed both upwards and downwards by the nozzles 38 of the two tubular portions 34 and 36. The sprayed absorption liquid contacts flue gas F flowing vertically upwards through tower 2 and absorbs sulphur dioxide from the flue gas F.

In the HC operating mode, which is performed under certain conditions as will be described in detail below, the absorption liquid sprayed by nozzles 38 dissipates, clears or drains from the flue gas quite slowly. The slow draining results in the formation of a "cloud" C located around and above the active spray level system 20. The cloud C comprises absorption liquid mixed with the flue gas F that cannot easily drain. Hence, cloud C almost resembles a bubbling bed. The intense mixing of absorption liquid and flue gas F in cloud C results in increased sulphur dioxide absorption levels and thereby efficient removal of sulphur dioxide from flue gas F. The absorption liquid eventually drains also from cloud C, as flow D. However, the absorption liquid does have a comparably long average residence time in cloud C before it is drained therefrom.

Cloud C, in HC operating mode, is obtained in the first spray level system 20 when the following parameters are met: an active nozzle density of at least 0.7 nozzles per m$^2$ of internal wet scrubber horizontal cross-sectional area; and an absorption liquid flow rate of at least 10 m$^3$/hour per active nozzle. Furthermore, the active nozzle density of at least 0.7 nozzles/m$^2$, and the flow of absorption liquid to each active nozzle of at least 10 m$^3$/hour, should yield, in HC operating mode and when multiplied together, an area based flow of absorption liquid supplied to the spray level system of at least 30 m$^3$ per hour and m$^2$ of internal wet scrubber horizontal cross-sectional area, hereinafter referred to as Total Flow. Hence, the active nozzle density and the flow per nozzle cannot both be at their minimum values when the spray level system is operated in HC operating mode, since the Total Flow would then only be 7 m$^3$ per hour and m$^2$ (0.7 nozzles/m$^2$×10 m$^3$/hour). Hence, for example, tower 2 having an inner diameter of 7.15 meters has an internal wet scrubber horizontal cross-sectional area of 40 m$^2$. Each spray level system should preferably be equipped with at least 0.7 nozzles/m$^2$. In the case of tower 2, this would be 0.7 nozzles/m$^2$×40 m$^2$=28 nozzles that are active in the HC operating mode. Furthermore, the flow of absorption liquid Q to each such active nozzle, when operating in HC operating mode, should preferably be at least 10 m$^3$ of absorption liquid per hour per nozzle, corresponding to at least 10000 liters/hour, or 167 liters/minute per nozzle. Still further, a Total Flow of at least 30 m$^3$/hour/m$^2$ is preferably supplied to said active nozzles of each spray level system operating in HC operating mode. Hence, in the case of tower 2, the amount of liquid supplied to each spray level system operating in HC mode should preferably be at least 30 m$^3$/hour/m$^2$×40 m$^2$=1200 m$^3$/hour. It will be appreciated that both parameters, i.e., active nozzle density and absorption liquid flow per active nozzle, cannot both be set to simultaneously operate at minimums within their range of operation if HC operating mode is to be achieved. Hence, if for example, the active nozzle density is 0.7 nozzles per m$^2$, then the absorption liquid flow per nozzle must be at least 42.9 m$^3$/hour, to achieve the minimum required Total Flow of at least 30 m$^3$/hour/m$^2$.

Referring now to the example of FIG. 2, the number of nozzles that are active in HC operating mode is 50, and the internal cross-sectional area as described above is 40 m$^2$. Hence, the active nozzle density is 1.25 nozzles per m$^2$. The desired Total Flow for HC operating mode is at least 30 m$^3$/hour/m$^2$. Thus, having a Total Flow of 30 m$^3$/hour/m$^2$ with a cross sectional area of 40 m$^2$ the required absorption liquid flow for the spray level system is 1200 m$^3$/h, i.e., 30 m$^3$/hour/m$^2$×40 m$^2$=1200 m$^3$/h. Using the minimum absorption liquid flow per active nozzle of 10 m$^3$/hour, at the 50 active nozzles of the spray level system 20, yields an absorption liquid flow in HC operating mode of 50 nozzles×10 m$^3$/hour/nozzle=500 m$^3$/h, which is not sufficient. With 50 nozzles of each spray level system and the 40 m$^2$ cross sectional area of the tower 2, operating in HC mode requires a minimum flow per nozzle of 24 m$^3$/h (calculated as the total amount of absorption liquid of 1200 m$^3$/h divided by 50 nozzles, or as the Total flow of 30 m$^3$/hour/m$^2$ divided by 1.25 nozzles per m$^2$).

Still further, the vertical velocity V of the flue gas flowing upward through vertical tower 2 approaching spray level system 20, is the unobstructed vertical velocity of the flue gas at the midpoint of the spray level system 20. Since vertical velocity V of the flue gas is an unobstructed velocity it disregards the blinding caused by tubular portions 34, 36, nozzles 38, etc. Hence, the unobstructed vertical velocity V of the flue gas cannot be measured directly at the midpoint of the actual spray level system 20, but may be measured indirectly by a gas velocity meter just upstream or downstream of the spray level system 20, for example at point P as illustrated in FIG. 4$c$. The unobstructed vertical velocity V of the flue gas may, as an alternative, be calculated from the measured gas flow in the tower 2, for example measured at the point P just below the spray level system, or obtained from the general plant control system, and dividing the thus measured gas flow, in m$^3$/s, by the internal wet scrubber horizontal cross-sectional area of the tower 2, as measured at the midpoint of the spray level system 20, in m$^2$, to obtain the unobstructed vertical velocity V of the flue gas, in m/s, at the midpoint of the spray level system 20. The flue gas unobstructed vertical velocity V is the actual gas velocity measured at the actual gas temperature, actual gas pressure, and actual gas composition prevailing just below the spray level system at point P. Such is calculated disregarding the internal structures of the spray level system itself and also disregarding the liquid draining downwards in tower 2. Therefore, using the parameters previously described for HC operating mode, the preferred minimum flue gas flow, in $m^3/s$, in the tower 2 may be calculated by multiplying the preferred minimum flue gas vertical velocity of 3.5 m/s by the horizontal cross-sectional area 40 $m^2$. Hence, the minimum flue gas flow in the tower 2 in the HC operating mode would preferably be at least 140 $m^3/s$, i.e., 3.5 $m/s \times 40\ m^2 = 140\ m^3/s$.

When the above indicated operating parameters are realized for a specific spray level system, that spray level system is considered to be operating in HC operating mode resulting in significantly increased sulphur dioxide absorption.

Figure 5:
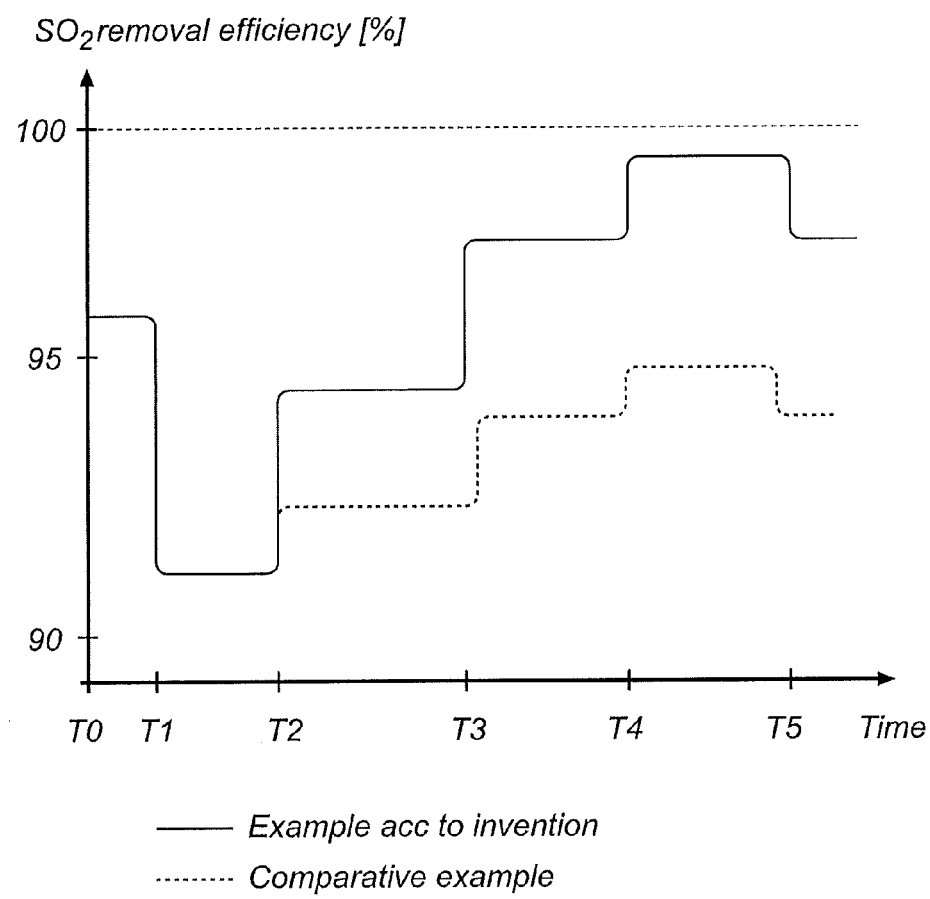
FIG. 5 is a schematic diagram illustrating the effect of a method of controlling the wet scrubber.

FIG. 5 illustrates one example of how control unit 54, illustrated in FIG. 1, may be used to control wet scrubber 1. The diagram of FIG. 5 illustrates the sulphur dioxide removal efficiency, in % on the Y-axis, versus the time, in hours, on the X-axis. An unbroken line depicts operation of a wet scrubber in accordance with an example of the inventive method. Starting at T0, the control unit 54 has shut off the second tubular portion of each of the first, second, and third spray level systems 20, 26, 32. Hence, with valves 58, 62, and 66 shut off, absorption liquid is only supplied to tubular portions 34, 40 and 44. This could be typical for wet scrubber operation during low boiler load, or when combusting a low sulphur-content coal. The sulphur dioxide removal efficiency of the wet scrubber under the described parameters is in the range of 96%. Hence, in this LC operating mode, all three spray level systems 20, 26, 32 have only their respective first tubular portions 34, 40 and 44 operating. With only the first tubular portions 34, 40, 44 in operation, only twenty-two of the total fifty available atomizing nozzles 38 of each spray level system, as depicted in FIG. 2, are active and operating. Hence, in this example and at T0 the active nozzle density of the respective spray level system in the LC operating mode is equal to 22/40 $m^2 = 0.55$ nozzles/per $m^2$ of internal horizontal wet scrubber cross-sectional area. The absorption liquid flow, Q, of each such active nozzle is, for example, 25 $m^3$ of absorption liquid per hour, using 22 nozzles (22 nozzles$\times$25 $m^3/h$=550 $m^3/h$) corresponds to a Total Flow of only 13.75 $m^3/hour/m^2$, i.e., 550 $m^3/hour/40\ m^2 = 13.75\ m^3/hour/m^2$. Hence, at time T0 the HC operating mode parameters of active nozzle density and area based flow of absorption liquid are not met, and each spray level system operates in LC operating mode.

At time T1 the boiler is fully loaded or is used to combust high sulphur content coal. This change in boiler conditions results in a drop in the wet scrubber sulphur dioxide removal from about 96% to about 91%. As a consequence, indicators within control unit 54 sense the drop in sulphur dioxide removal efficiency and automatically changes parameters within the wet scrubber. To this end, control unit 54 causes valve 66 of the second tubular portion 46 of the third spray level system 32 to open. Hence, at T2, valve 66 is opened.

Figure 4C:
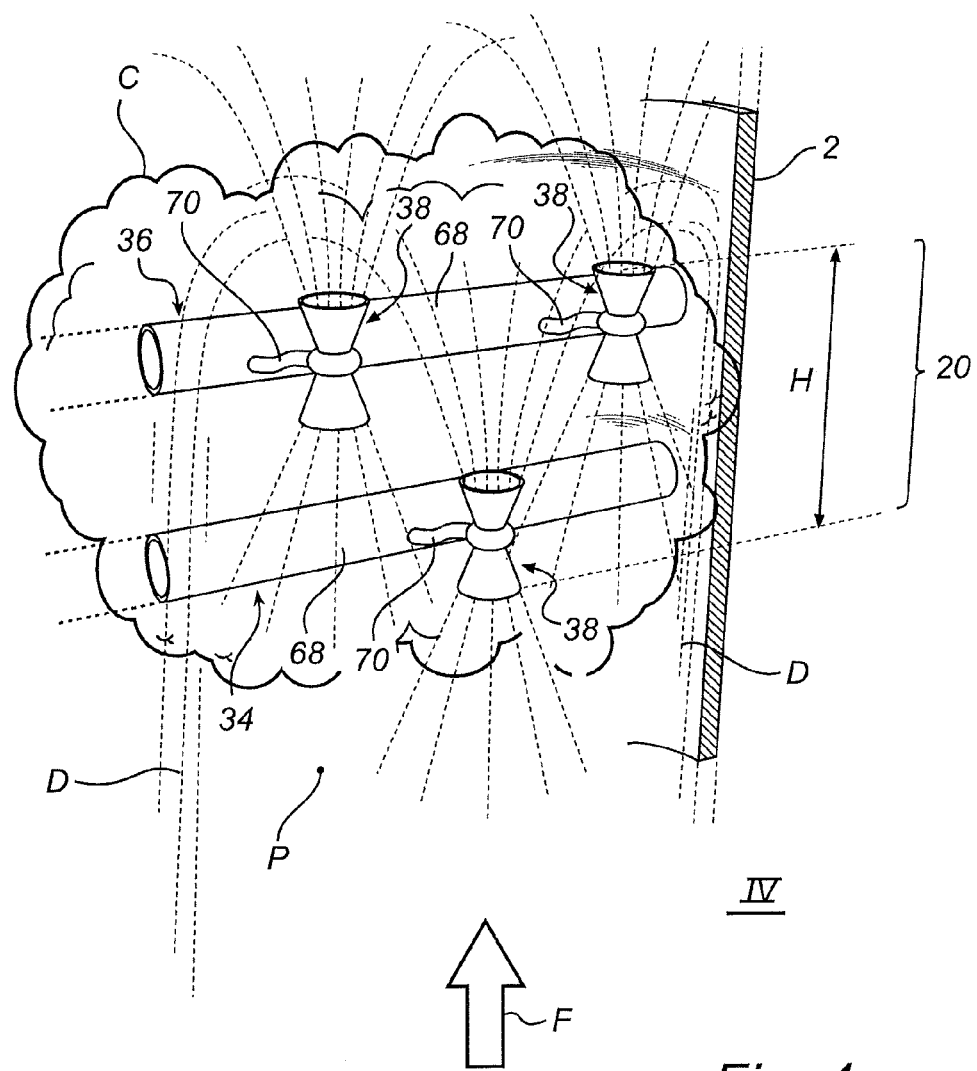
FIG. 4c is an enlarged side-view illustrating a HC operating mode.

At the time T2, the operating conditions of the third spray level system 32 are shifted into its HC operating mode. Hence, the third spray level system 32 operates with an active nozzle density of at least 0.7 nozzles/$m^2$, an absorption liquid flow, Q, of each such active nozzle of at least 10 $m^3/hour$, a Total Flow of at least 30 $m^3/hour/m^2$, and an unobstructed flue gas vertical velocity, V, at point P just below spray level system 32, of at least about 3.5 m/s. When applied to the example of FIG. 2, the active nozzle density in the HC operating mode would be equal to 1.25 nozzles/$m^2$, i.e., 50 nozzles/40 $m^2$=1.25 nozzles/$m^2$. A per active nozzle absorption liquid flow of, for example, 25 $m^3/hour$ yields a Total Flow of 31.25 $m^3/hour/m^2$, i.e., 1.25 nozzles/$m^2 \times 25$ $m^3/hour=31.25\ m^3/hour/m^2$. Hence, assuming the flue gas vertical velocity parameter is met, after the time T2 all conditions for a HC operating mode are fulfilled for the third spray level system 32. These conditions result in the formation of a "cloud" of absorption liquid and flue gas being formed around and above the third spray level system 32, as illustrated in FIG. 4c. As depicted in FIG. 5, the sulphur dioxide removal efficiency increases at time T2, from about 91% to about 94%.

At time T3, control unit 54 signals that the sulphur dioxide removal efficiency is still too low. Hence, control unit 54 causes at the time T3, valve 62 of second tubular portion 42 of the second spray level system 26 to open. As a consequence, the second spray level system 26 enters its HC operating mode, and a cloud of absorption liquid and flue gas is formed around and above the second spray level system 26. With both the third spray level system 32 and the second spray level system 26 operating in HC operating mode, the sulphur dioxide removal increases at time T3 to 97.5%. A 97.5% sulphur dioxide removal efficiency would sometimes be sufficient with respect to emission requirements stipulated by environmental authorities. However, during the time span T1 to T3 the sulphur dioxide removal efficiency was slightly lower than that required. In order to compensate for this period of lower sulphur dioxide removal, and to reduce the wet scrubber's 24-hour rolling average amount of sulphur dioxide emissions, control unit 54 causes at time T4, control valve 58 of the second tubular portion 36 of the first spray level system 20 to open. As a consequence, the first spray level system 20 enters its HC operating mode, and a cloud of absorption liquid and flue gas is formed around and above the first spray level system 20. With all three spray level systems 20, 26 and 32 operating in their HC operating modes, the wet scrubber sulphur dioxide removal increases at time T4 to 99%. At time T5, control unit 54 signals that the 24-hour rolling average amount of sulphur dioxide emissions is again within the desired limits and causes valve 58 to close. With valve 58 closed, first spray level system 20 returns to its LC operating mode, while the third and second spray level systems 32, 26 remain operating in their HC operating modes.

FIG. 5 also depicts, with a broken line, the prior art method. In the prior art method, the flow of absorption liquid and flue gas flow is the same as that described for the present invention, depicted in FIG. 5 with an unbroken line. However, the prior art method does not provide for an HC operating mode. Thus, in accordance with the prior art method, no "cloud" of absorption liquid and flue gas is ever formed. As illustrated in FIG. 5 for the prior art method, the sulphur dioxide removal efficiency is about 92% at time T2, about 93.5% at time T3, and about 94% at time T4. As also illustrated in FIG. 5 for the prior art method, a desired removal efficiency of, e.g., 97.5%, cannot be reached. In order to reach a sulphur dioxide removal efficiency of 97.5%, the prior art method would have to be modified so as to be capable of supplying more absorption liquid to the wet scrubber. To supply additional absorption liquid to the wet scrubber, the equipment would have to be modified to add spray level systems to a total of four, five or even six separate spray level systems. A total of four, five or even six separate spray level systems for the prior art method would require one to modify the wet scrubber vertical tower to be significantly higher to accommodate all the spray level systems, resulting in increased investment, operating and maintenance costs.

As described above with reference to FIG. 5, the third and uppermost spray level system 32 was the first converted to HC operating mode. It will be appreciated that it would also have been possible and effective to first have either the first or the second spray level system 20 or 26 convert to HC operating mode.

Figure 6:
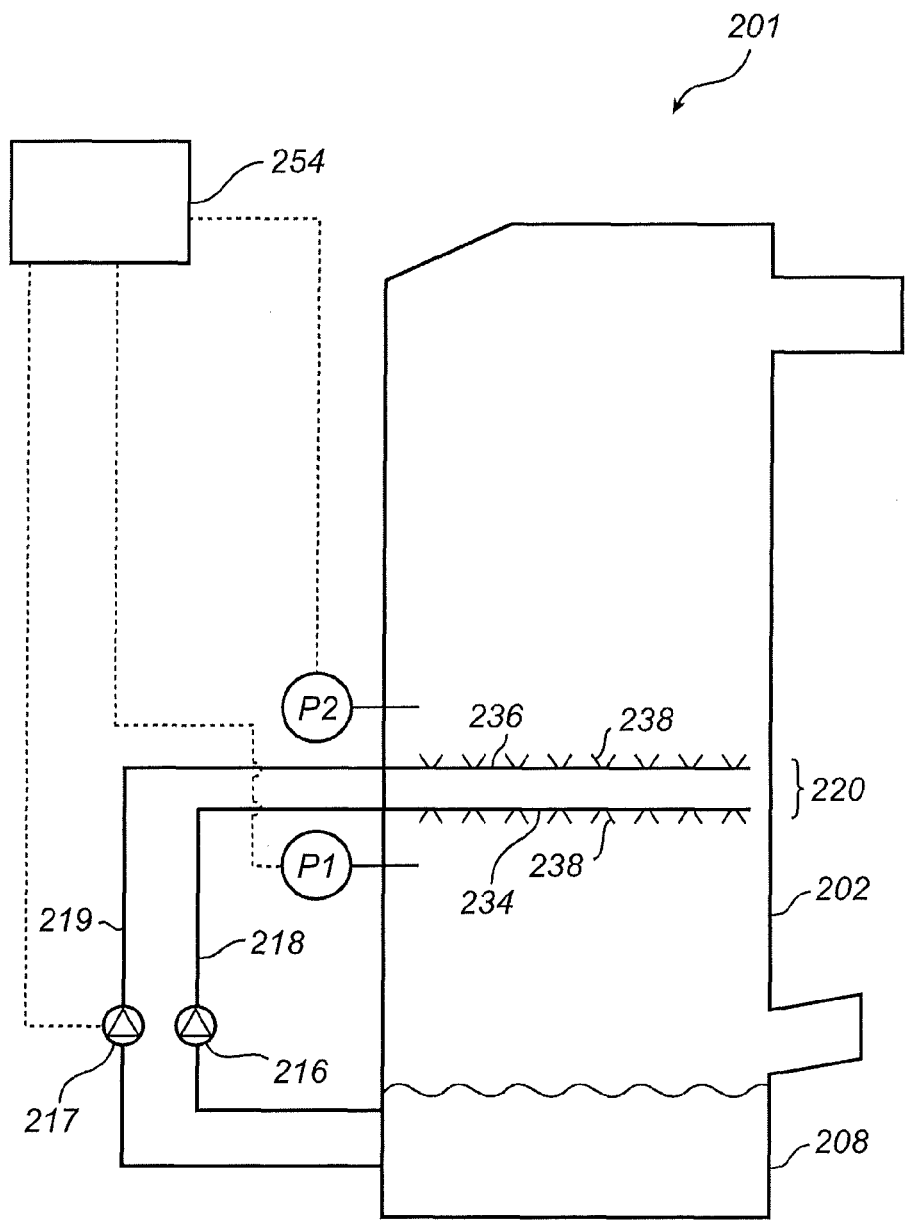
FIG. 6 is a schematic side view of a wet scrubber in accordance with a second embodiment.

FIG. 6 illustrates a wet scrubber 201 in accordance with an alternative embodiment. The wet scrubber has a tower 202 which comprises three spray level systems, of which only the first, lower, spray level system 220 is illustrated in FIG. 6 for the purpose of maintaining clarity of illustration therein. The first spray level system 220 comprises a first, lower tubular portion 234, and a second, upper tubular portion 236. The tubular portions 234, 236 may typically be of the design that has been illustrated hereinbefore with reference to FIGS. 2 and 3. Each of the tubular portions 234, 236 carries a number of atomizing nozzles 238. A first circulation pump 216 is operative for supplying the first tubular portion 234 with absorption liquid from an absorption liquid tank 208 via a first absorption liquid circulation pipe 218. Absorption liquid tank 208 is located in the bottom of the tower 202. A second circulation pump 217 is operative for supplying the second tubular portion 236 with absorption liquid from the absorption liquid tank 208, via a second absorption liquid circulation pipe 219. A control unit 254 is operative for controlling the operation of the second circulation pump 217. Hence, the control unit 254 may stop pump 217 when spray level system 220 is to operate in LC operating mode. When spray level system 220 is to operate in HC operating mode, control unit 254 causes pump 217 to start and to adjust the revolutions per minute (rpm) of the pump to an effective rate for HC operating mode, as described hereinbefore. Thus, the second pump 217 will function as a control device controlling the flow of absorption liquid to the second tubular portion 236 independently of the flow of absorption liquid to the first tubular portion 234. Optionally, control unit 254 may also control the operation of the first pump 216.

As illustrated in FIG. 6, a first pressure transducer P1 is positioned below the first spray level system 220, and a second pressure transducer P2 is positioned above the first spray level system 220. Control unit 254 is operative for receiving signals from the two pressure transducers, P1 and P2. By comparing the signals from the two pressure transducers, P1 and P2, control unit 254 senses flue gas pressure drop over the spray level system 220, and based thereon, controls the amount of absorption liquid supplied by means of the second pump 217, to achieve the desired parameters necessary to form the above referenced "cloud" C, illustrated in FIG. 4c.

Figure 7:
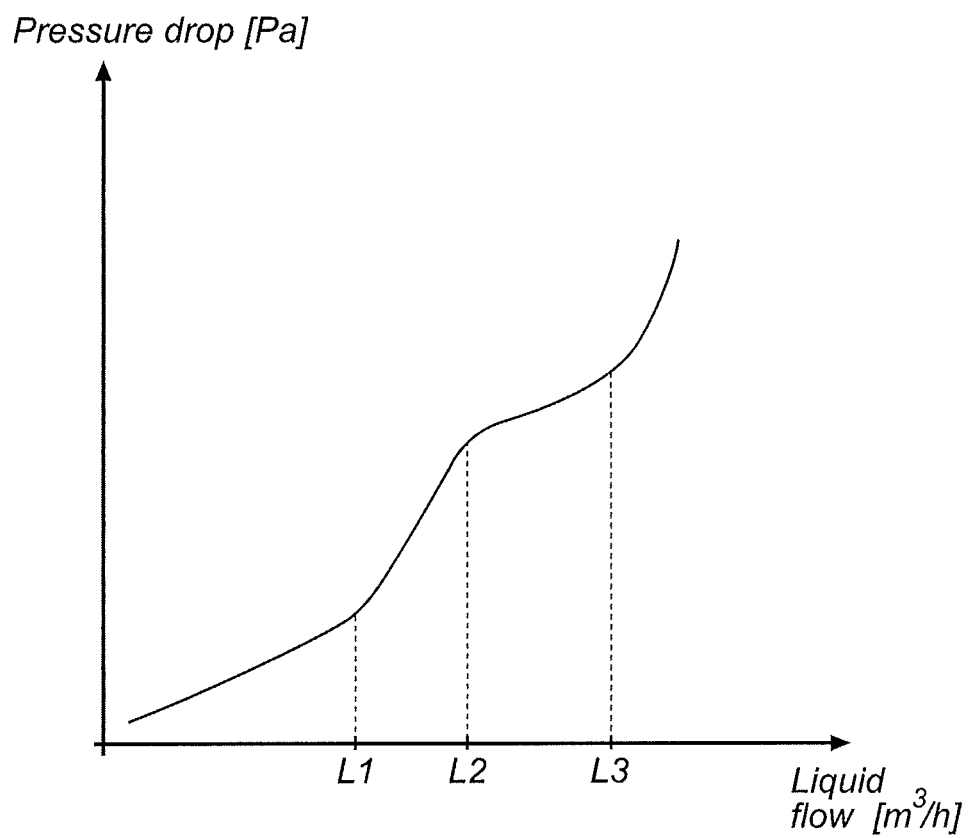
FIG. 7 is a schematic diagram illustrating a method of controlling the wet scrubber illustrated in FIG. 6.

FIG. 7 illustrates a correlation between the absorption liquid flow rate, in m³/hour, on the X-axis, that is supplied by means of the pump 217, and the flue gas pressure drop, in Pascals, on the Y-axis, measured as previously described with reference to FIG. 6, over the first spray level system 220. FIG. 7 illustrates the pressure drop measured over the spray level system 220 at a constant flow of flue gas F. Hence, the pressure drop depicted in FIG. 7 is only influenced by the rate absorption liquid is supplied to the spray level system 220, and not by any variations in the flow of flue gas entering the wet scrubber. As depicted in FIG. 7, the relationship between pressure drop and absorption liquid flow is initially somewhat linear. At absorption liquid flow L1, the pressure drop starts to increase rather quickly. This indicates the start of the formation of the desired "cloud" C of absorption liquid and flue gas. At absorption liquid flow L2, the cloud C is fully formed, leading to the enhanced removal of sulphur dioxide that has been described hereinbefore with regard to FIG. 5. As illustrated in FIG. 7, at absorption liquid flow L2, the relation between absorption liquid flow and pressure drop re-assumes a rather linear behaviour. At absorption liquid flow L3 the pressure drop starts to increase steeply again to unacceptably high levels. Such high levels are considered unacceptable due to the significant power consumption demands required to forward the flue gas through the tower. The control unit 254 controls, based on input from the pressure transducers P1, P2 illustrated in FIG. 6, the absorption liquid flow supplied by the second pump 217 to be just above the absorption liquid flow L2, hence generating the advantageous cloud C of absorption liquid and flue gas, without causing an undue pressure drop. Consequently, the flue gas pressure drop measured over the spray level system 220 by means of the pressure transducers P1, P2 is utilized as an indicator as to whether the spray level system 220 is operated in HC operating mode or in LC operating mode. It will be appreciated that curves of the type depicted in FIG. 7 can be prepared for various flows of flue gas, such that variations in the flow of flue gas can be accounted for when determining whether spray level system 220 is operated in HC or in LC operating mode.

It will be appreciated that control unit 54 illustrated in FIG. 1, may also be used to control valves 56, 58, 60, 62, 64 and 66 associated with tubular portions 34, 36, 40, 42, 44 and 46 according to principles similar to those described with regard to FIG. 7, to achieve HC operating mode without causing an undue flue gas pressure drop.

It will be appreciated that numerous variants of the embodiments described above are possible within the scope of the appended claims.

Hereinbefore it has been described that each spray level system comprises two tubular portions, for example a first tubular portion 34 and a second tubular portion 36. It will be appreciated that one or several spray level systems could be provided with three or more tubular portions that are individually controllable.

Hereinbefore it has been described that the wet scrubber is utilized for removing sulphur dioxide from a process gas in the form of a flue gas generated in the combustion of coal or oil. It will be appreciated that the wet scrubber is equally well suited for removing sulphur dioxide and like sulphur contaminants from other types of process gases. One example is the process gases in the form of flue gases generated in the incineration of waste, such as industrial, municipal or hazardous waste. The wet scrubber described hereinbefore is well suited for removing the varying sulphur dioxide concentrations that can be expected during the incineration of waste material. The wet scrubber is also well suited for removing sulphur dioxide and like sulphur contaminants from other types of process gases including process gases generated in metallurgical processes, etc.

Hereinbefore it has been described that the wet scrubber 1 comprises a vertical open tower 2. It will be appreciated that a wet scrubber could also comprise a tower that comprises various inserts, such as trays. An example of such trays is disclosed in U.S. Pat. No. 5,246,471.

Hereinbefore it has been described that the atomizing nozzles are of the dual orifice type, oriented to spray both upwards and downwards. It will be appreciated that other nozzle types could be utilized as well. For example, atomizing nozzles that spray only upwards, atomizing nozzles that spray only downwards, atomizing nozzles that spray only to the side or some combination thereof could be utilized in an entire spray level system. Furthermore, it would also be possible to have atomizing nozzles that only spray downwards on the first tubular portion of a spray level system, and atomizing nozzles that spray only upwards on the second tubular portion of a spray level system. Other such combinations and variations are also possible.

To summarize, a method of cleaning a process gas containing sulphur dioxide comprises utilizing a wet scrubber 1 comprising at least one spray level system 20 with atomizing nozzles 38 to which an absorption liquid is supplied for atomization by nozzles 38. The method comprises operating the spray level system 20 in at least a HC operating mode with an active nozzle density of at least 0.7 nozzles per $m^2$ of internal wet scrubber horizontal cross-sectional area. Supplying each of the active nozzles 38 of said spray level arrangement 20 with an absorption liquid flow of at least 10 $m^3$/hour. The active nozzle density and the supply of absorption liquid to each active nozzle of the spray level system yields when multiplied together a Total Flow of at least 30 $m^3$/hour/$m^2$.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a process gas containing sulphur dioxide by means of a wet scrubber comprising:

atomizing an absorption liquid through active nozzles of at least one spray level system of said wet scrubber, with each of said at least one spray level system comprising at least a first tubular portion equipped with nozzles distributed substantially evenly over a horizontal cross-section of the wet scrubber and a second tubular portion equipped with nozzles distributed substantially evenly over a complete horizontal cross-section of the wet scrubber, controlling an amount of absorption liquid supplied to the first tubular portion independently from an amount of absorption liquid supplied to the second tubular portion in each of said at least one spray level system, operating said wet scrubber in at least a first operating mode with a spray level system active nozzle density of at least 0.7 nozzles/$m^2$, supplying active nozzles of each spray level system with an absorption liquid flow of at least 10 $m^3$/hour, and supplying a Total Flow of absorption liquid of at least 30 $m^3$/hour/$m^2$ to the spray level system for a process gas with a vertical velocity of at least about 3.5 m/s.

2. A method according to claim 1, wherein said at least one spray level system comprises at least two spay level systems.

3. A method according to claim 1, further comprising controlling the amount of absorption liquid supplied independently to each of said first tubular portion and second tubular portion of each spray level system between operation of the spray level systems in a first higher absorption capacity operating mode, and in a second lower absorption capacity operating mode.

4. A method according to claim 1, wherein the amount of absorption liquid supplied independently to each of said first tubular portion and second tubular portion of each spray level system is controlled based on a measured process gas pressure drop over the spray level system.

5. A method according to claim 1, wherein the wet scrubber comprises at least two spray level systems, each of which is individually controllable to convert operation of the individual spray level systems between said first operating mode and a second operating mode.

6. A method according to claim 1, wherein said spray level system in said first operating mode, utilizes at least one third of said nozzles to spray at least a portion of the absorption liquid supplied thereto in an upward direction.

7. A method according to claim 1, wherein a vertical height of the spray level system is less than 0.75 m.

8. A method according to claim 1, wherein the active nozzle density of the spray level system is less than 5 nozzles per $m^2$.

9. A method according to claim 1, wherein each nozzle is operative for atomizing an absorption liquid flow of at least 10 $m^3$/hour at a water spraying pressure of 0.3-2.0 bar.

10. A method according to claim 1, wherein the absorption liquid flow supplied to each nozzle is less than 180 $m^3$/hour and the Total Flow is less than 200 $m^3$/hour/$m_2$.

11. A method according to claim 1, wherein the process gas has a vertical velocity of less than 8 m/s.

* * * * *